(12) United States Patent
Goto

(10) Patent No.: US 7,681,044 B2
(45) Date of Patent: Mar. 16, 2010

(54) SECURE PROCESSOR AND SYSTEM

(75) Inventor: Seiji Goto, Kawasaki (JP)

(73) Assignee: Fujitsu Microelectronics Limited, Yokohama (JP)

(*) Notice: Subject to any disclaimer, the term of this patent is extended or adjusted under 35 U.S.C. 154(b) by 1218 days.

(21) Appl. No.: 11/225,180

(22) Filed: Sep. 14, 2005

(65) Prior Publication Data
US 2006/0288235 A1 Dec. 21, 2006

(30) Foreign Application Priority Data
Jun. 17, 2005 (JP) ............................. 2005-177628

(51) Int. Cl.
H04L 9/32 (2006.01)
H04L 9/00 (2006.01)
G06F 11/30 (2006.01)

(52) U.S. Cl. ........................ 713/190; 713/191; 713/192; 713/193; 713/194; 726/27; 726/28; 726/29; 726/30

(58) Field of Classification Search .................. 713/190
See application file for complete search history.

(56) References Cited

U.S. PATENT DOCUMENTS 5,224,166 A * 6/1993 Hartman, Jr. ................ 713/190
7,475,257 B2 * 1/2009 Aguilar et al. .............. 713/189

FOREIGN PATENT DOCUMENTS

JP 2002-353960 A 12/2002
JP 2003-280989 A 10/2003
JP 2004-320533 A 11/2004

* cited by examiner

Primary Examiner—Longbit Chai
(74) Attorney, Agent, or Firm—Arent Fox LLP

(57) ABSTRACT

A processor includes an execution unit configured to execute a program, a bus coupled to the execution unit, a local memory coupled to the bus, a DMA unit coupled to the bus, and an interface to couple the bus to an exterior, wherein the DMA unit is configured to perform a DMA transfer process in response to instruction from the execution unit, to load information by the DMA transfer process from the exterior through the interface, to decrypt the loaded information, and to write the decrypted information to the local memory by the DMA transfer process.

10 Claims, 7 Drawing Sheets

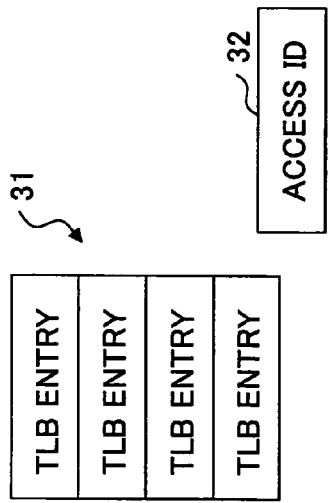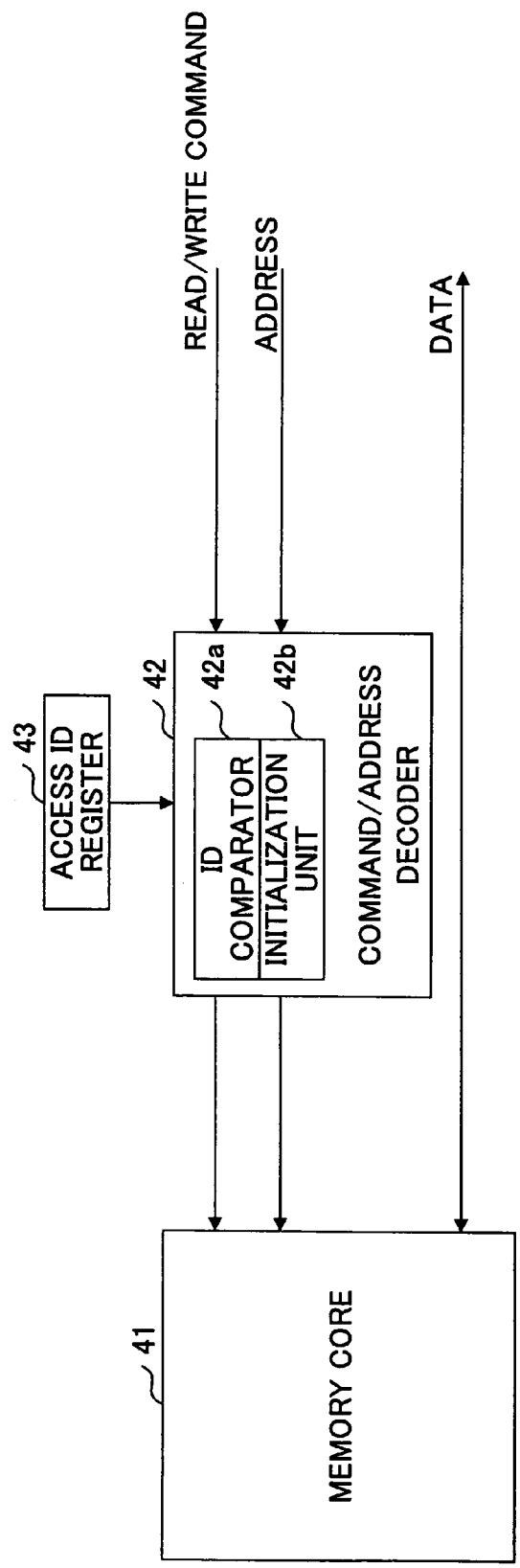

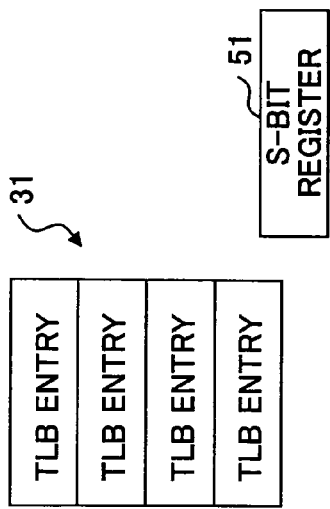
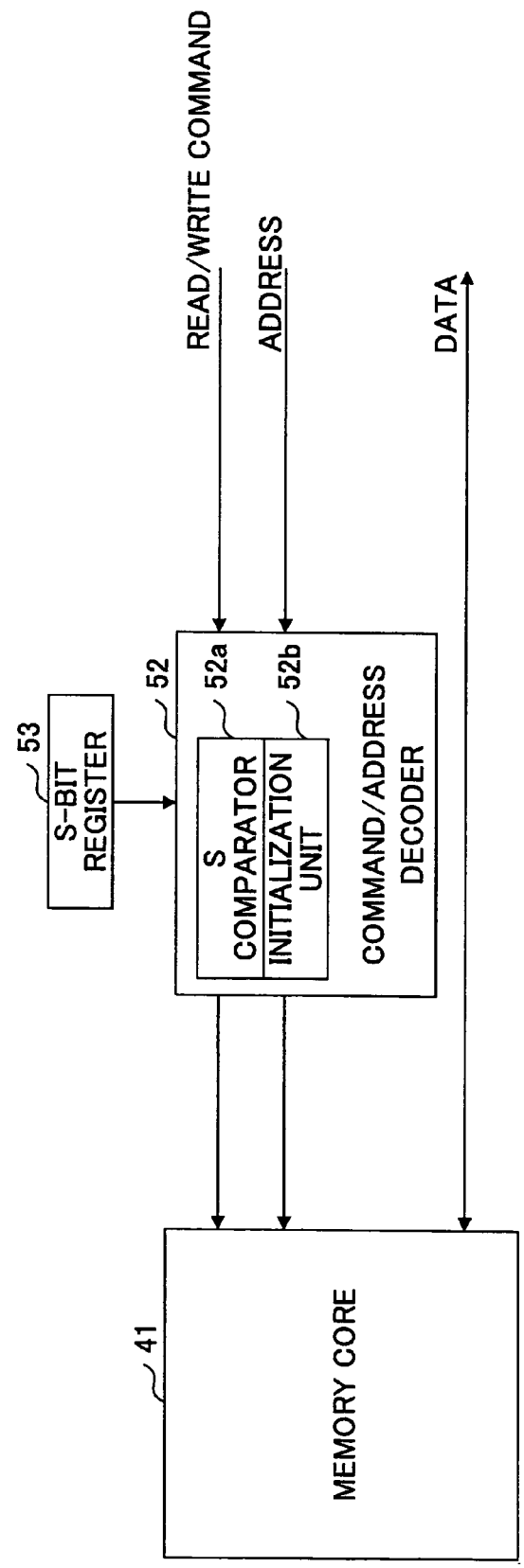

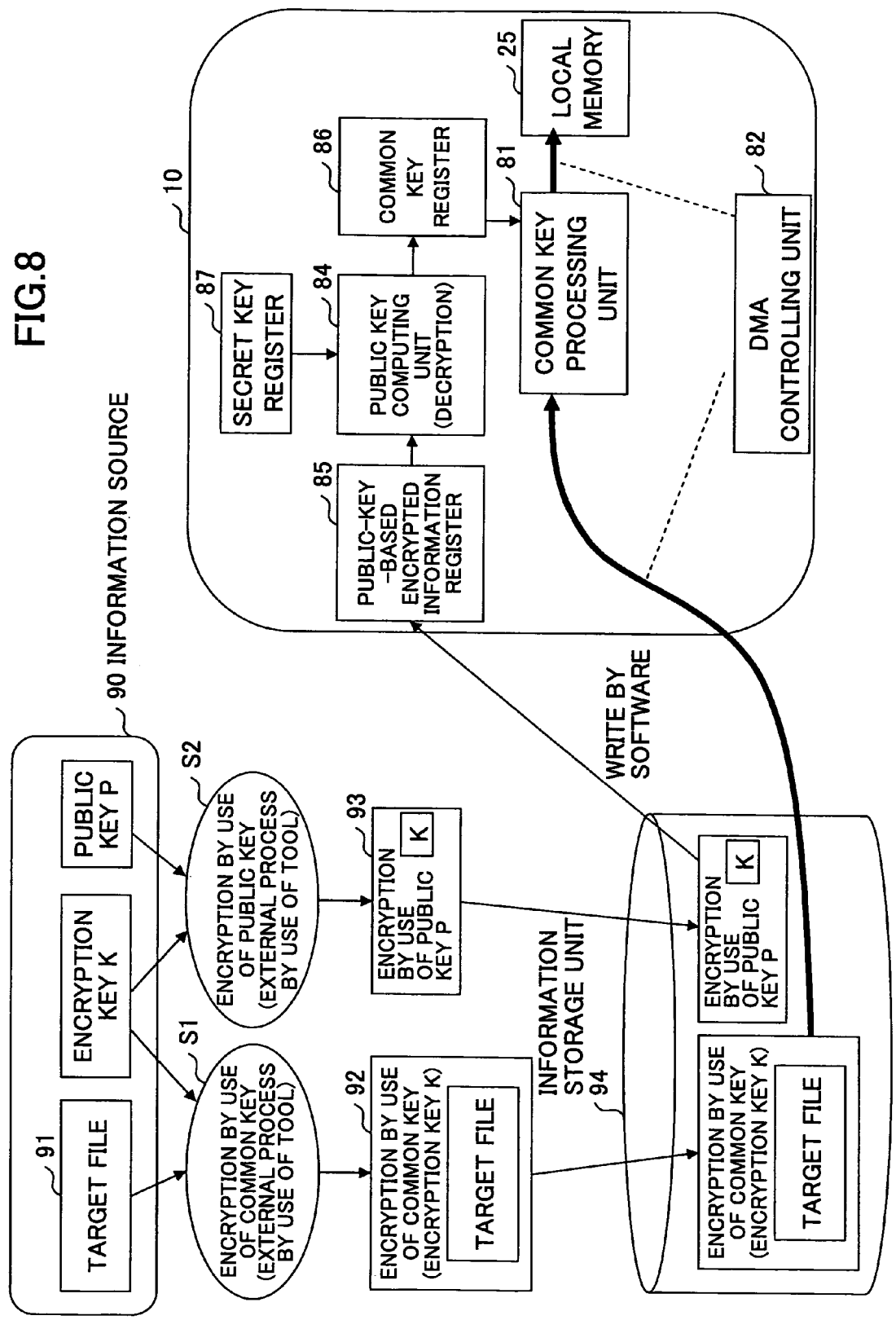

US 7,681,044 B2

SECURE PROCESSOR AND SYSTEM

CROSS-REFERENCE TO RELATED APPLICATIONS

The present application is based upon and claims the benefit of priority from the prior Japanese Patent Application No. 2005-177628 filed on Jun. 17, 2005, with the Japanese Patent Office, the entire contents of which are incorporated herein by reference.

BACKGROUND OF THE INVENTION

1. Field of the Invention

The present invention generally relates to processors and systems using processors, and particularly relates to a processor with an information security function and a system using such a processor.

2. Description of the Related Art

Processor-based systems allow programs to be used to define their operations, so that these systems are more flexible than systems operating based on hardware alone, allowing a variety of functions to be implemented easily. Because of such advantages, processor-based systems are used in a variety of fields, and are even beginning to be used in the field such as electronic business transaction where a high degree of security is required. In order to provide high security, various measures such as user authentication need to be implemented at the system level. In recent years, however, security issues have been discussed not only at the system level but also at the software level and processor level.

For example, when data and/or executable instruction codes are to be stored in a main memory device or secondary memory device, security may be ensured by encrypting the data and/or executable instruction codes. At the time of execution of instructions, the encrypted data and/or executable instruction codes are decoded and stored in a cache memory inside the processor, followed by executing the process. With this configuration, if hardware for performing the encryption process is implemented on a chip separate from the processor chip, the processing speed and encryption performance may become a problem.

Technology described in Patent Document 1 is an example of conventional technologies relating to such software execution environment. Patent Document 1 discloses a code executing apparatus which checks the validity of an encrypted code by authenticating the encrypted execution code, and which has a secure processor that fetches an instruction corresponding to the encrypted code, followed by executing the instruction as a secured task.

Such code executing apparatus, however, requires a large-scale modification to software. Depending on usages, there may be a case in which it is necessary to encrypt and protect only a particular portion of the instructions and data. The configuration as described above that requires a large-scale software modification is not desirable in terms of cost-effectiveness.

In a typical processor, an execution unit for decoding and executing instructions fetches instructions via a memory management unit, a cache memory, and a bus interface, and stores execution results in memory. Such operations are repeated one after another. An attempt to implement a full security function for such a typical processor results in an encryption circuit being inserted into the data path, thereby performing encryption and decryption with respect all the information inclusive of the instructions and execution results. However, the security function to protect all the information may not be necessary, and the encryption and protection of only a portion of the information may suffice to achieve the objective, depending on the usage. In such a case, the full protection as described above simply means an excessively large scale and excessive costs.

[Patent Document 1] Japanese Patent Application Publication No. 2002-353960

[Patent Document 2] Japanese Patent Application Publication No. 2003-280989

[Patent Document 3] Japanese Patent Application Publication No. 2004-320533

Accordingly, there is a need for a processor and system having an efficient configuration suitable for the needs when it is sufficient to encrypt and protect only a portion of the information.

SUMMARY OF THE INVENTION

It is a general object of the present invention to provide a processor and system that substantially obviate one or more problems caused by the limitations and disadvantages of the related art.

Features and advantages of the present invention will be presented in the description which follows, and in part will become apparent from the description and the accompanying drawings, or may be learned by practice of the invention according to the teachings provided in the description. Objects as well as other features and advantages of the present invention will be realized and attained by a processor and system particularly pointed out in the specification in such full, clear, concise, and exact terms as to enable a person having ordinary skill in the art to practice the invention.

To achieve these and other advantages in accordance with the purpose of the invention, the invention provides a processor, which includes an execution unit configured to execute a program, a bus coupled to the execution unit, a local memory coupled to the bus, a DMA unit coupled to the bus, and an interface to couple the bus to an exterior, wherein the DMA unit is configured to perform a DMA transfer process in response to instruction from the execution unit, to load information by the DMA transfer process from the exterior through the interface, to decrypt the loaded information, and to write the decrypted information to the local memory by the DMA transfer process.

According to another aspect of the present invention, a system includes a memory, an external bus coupled to the memory, and a processor coupled to the external bus, wherein the processor includes an execution unit configured to execute a program, an internal bus coupled to the execution unit, a local memory coupled to the internal bus, a DMA unit coupled to the internal bus, and an interface to couple the internal bus to the external bus, wherein the DMA unit is configured to perform a DMA transfer process in response to instruction from the execution unit, to load information by the DMA transfer process from the memory through the interface, to decrypt the loaded information, and to write the decrypted information to the local memory by the DMA transfer process.

According to at least one embodiment of the present invention, data or instruction codes that require security protection are stored outside the processor in an encrypted state, and are stored in a decrypted state in the local memory within the processor. With provision that makes the local memory accessible only from within the processor, the decrypted information cannot be accessed from outside. This provides a high-safety feature for information security. Compared with a typical processor configuration, only the modules of the DMA unit and the local memory are added, allowing the processor of the present invention to be easily implemented.

If the information loaded from the exterior is a plaintext that is not encrypted, the local memory provided in the processor is not utilized. In this case, the plaintext information loaded from the exterior is supplied directly to the execution unit without passing through the local memory. Namely, the processor operates in the same manner as does a typical processor in the case of plaintext information, and performs a decryption process efficiently within the processor by use of the DMA unit and the local memory in the case of encrypted information.

BRIEF DESCRIPTION OF THE DRAWINGS

Other objects and further features of the present invention will be apparent from the following detailed description when read in conjunction with the accompanying drawings, in which:

FIGS. 3A and 3B are drawings showing the configuration of a first embodiment of a MMU and a local memory;

FIGS. 4A and 4B are drawings showing the configuration of a second embodiment of the MMU and the local memory;

FIG. 8 is a drawing for explaining the flow of information in the case where the secure DMA of the third embodiment is used.

DESCRIPTION OF THE PREFERRED EMBODIMENTS

In the following, embodiments of the present invention will be described with reference to the accompanying drawings.

Figure 1:
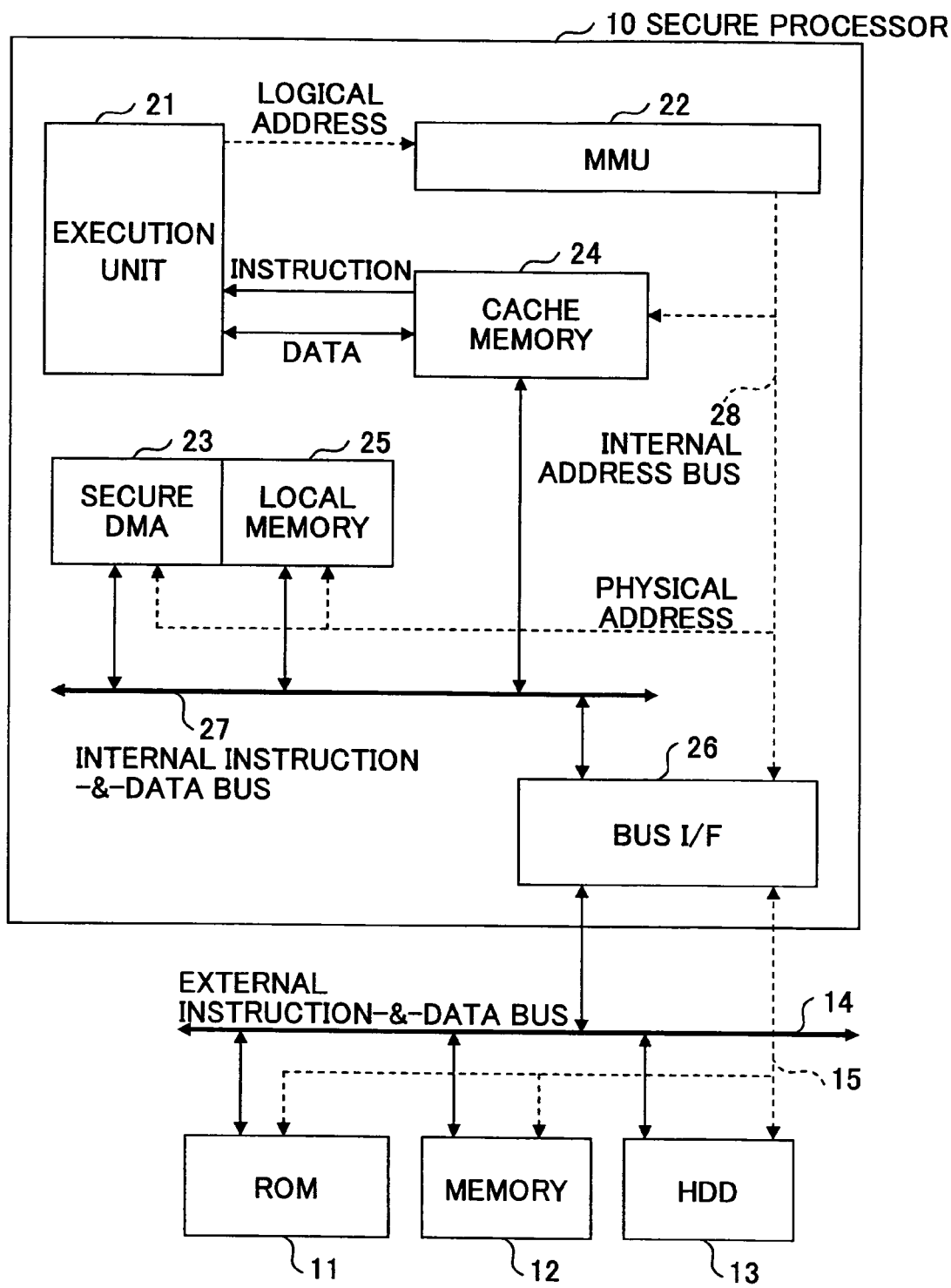
FIG. 1 is a drawing showing the configuration of a system in which a secure processor according to the present invention is used.

FIG. 1 is a drawing showing the configuration of a system in which a secure processor according to the present invention is used. In the following description, the processor as shown in FIG. 1 provided with an information security function according to the present invention will be referred to as a "secure processor".

The system of FIG. 1 includes a secure processor 10, a ROM 11, a memory 12, an HDD 13, an external instruction-&-data bus 14, and an external address bus 15. The ROM 11, the memory 12, and the HDD 13 are coupled to the secure processor 10 via the external instruction-&-data bus 14 and the external address bus 15. The ROM 11, the memory 12, and the HDD 13 store information such as data and instruction codes therein in an encrypted state or in a plaintext state (unencrypted state).

The secure processor 10 includes an execution unit 21, a memory management unit (MMU) 22, a secure DMA 23, a cache memory 24, a local memory 25, and a bus interface (bus I/F) 26. The execution unit 21, the secure DMA 23, the cache memory 24, the local memory 25, and the bus I/F 26 are coupled to each other via an internal instruction-&-data bus 27. Further, the MMU 22, the secure DMA 23, the cache memory 24, the local memory 25, and the bus I/F 26 are coupled to each other via an internal address bus 28.

The execution unit 21 is a CPU, and executes a program by fetching a series of instructions constituting the program from memory and by decoding and executing the instructions. In conduction with the execution of the program, the execution unit 21 accesses the ROM 11, the memory 12, and the HDD 13, thereby performing the reading and writing of information with respect to specified addresses.

As the execution unit 21 supplies a logical address to the MMU 22, the MMU 22 converts the logical address into a physical address, and transmits the physical address after the conversion to the address bus. With this provision, the execution unit 21 can access a physical address corresponding to a specified logical address.

In the present invention, the secure DMA 23 and the local memory 25 are provided inside the secure processor 10. The secure DMA 23 has an encryption-&-decryption function in addition to a conventional DMA (direct memory access) transfer function. In response to a startup command from the execution unit 21, the secure DMA 23 performs a DMA transfer process, thereby reading encrypted information (encrypted data and instruction codes) from specified addresses in a transfer source (e.g., the memory 12) outside the secure processor 10, and loading the encrypted information into the secure DMA 23 via the external instruction-&-data bus 14 and the bus I/F 26. The secure DMA 23 uses its decryption function to decrypt the encrypted information loaded through the DMA transfer process, and transfers the decrypted information through the DMA transfer process to the local memory 25 serving as a transfer destination for storage in specified addresses. After the completion of the DMA transfer process, the execution unit 21 accesses the decrypted information stored in the local memory 25, thereby performing a process as appropriate.

Further, the secure DMA 23 performs a DMA transfer process in response to a startup command from the execution unit 21, thereby reading plaintext information stored in the local memory 25 for transfer to the transfer destination (e.g., the memory 12) outside the secure processor 10 via the bus I/F 26 and the external instruction-&-data bus 14. In so doing, the secure DMA 23 uses its encryption function to encrypt the plaintext information of the local memory 25 while performing the DMA transfer process, and transmits the encrypted information to outside the secure processor 10.

In this embodiment of the present invention as described above, the data or instruction codes that require security protection are stored outside the secure processor 10 always in an encrypted state, and are stored in a decrypted state in the local memory 25 within the secure processor 10. The local memory 25 is accessible only from within the secure processor 10, so that the decrypted information cannot be accessed from outside. In contrast with the configuration in which information is decrypted in a memory outside the processor, the security of information is significantly improved. Compared with a typical processor configuration, only the modules of the secure DMA 23 and the local memory 25 are added, allowing the secure processor 10 of the present invention to be easily implemented.

If the information loaded from the exterior into the secure processor 10 of the present invention is a plaintext that is not encrypted, the local memory 25 is not utilized. In this case, the plaintext information loaded from the exterior is stored in the cache memory 24 in the same manner as in the case of a typical processor. The execution unit 21 then accesses the cache memory 24 to use the stored information. Namely, the secure processor 10 operates in the same manner as a typical processor in the case of plaintext information, and performs a decryption process efficiently within the processor by use of the secure DMA 23 and the local memory 25 in the case of encrypted information. The same applies in the case where plaintext information is written to the memory 12, for example. That is, the information is written from the execution unit 21 to the memory 12 via the cache memory 24 in the same manner as in the case of a typical processor.

Figure 2B:
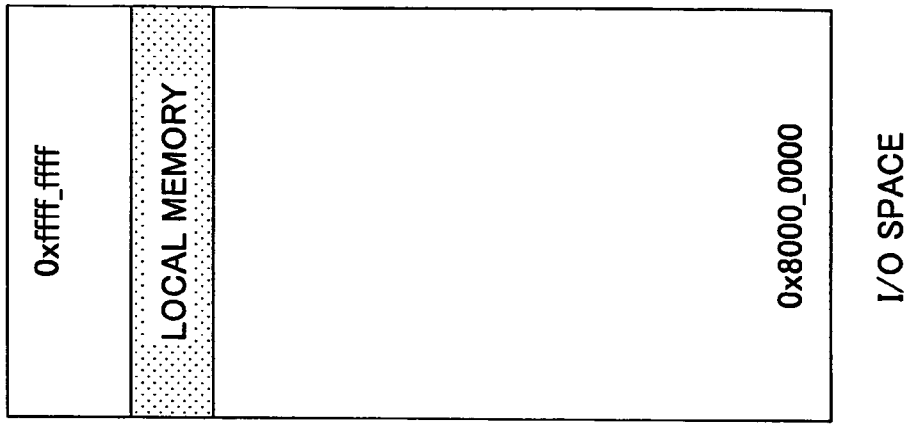
FIGS. 2A and 2B are drawings showing the relationships between a main memory, a cache memory, and a local memory.
Figure 2A:
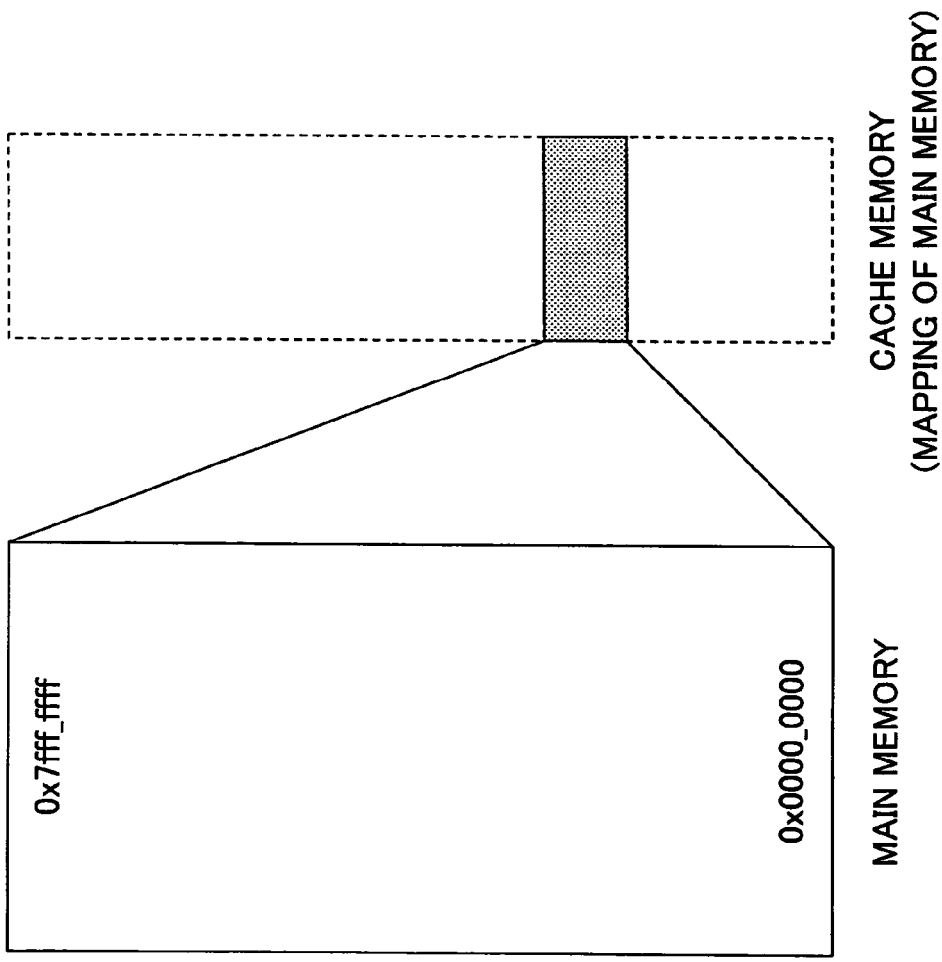

FIGS. 2A and 2B are drawings showing the relationships between the main memory, the cache memory 24, and the local memory 25. As shown in FIG. 2A, the memory space of the main memory (from address 0x0000_0000 to address 0x7fff_ffff in this example) is partially allocated to the cache memory. Namely, when the execution unit 21 accesses an address in the memory space, the content of the address is copied from the main memory to the cache memory 24, resulting in the portion of the contents of the main memory being kept in the cache memory 24.

On the other hand, the local memory 25 as shown in FIG. 2B is allocated to an address area separate from the main memory area (0x0000_0000 through 0x7fff_ffff) in I/O space. In the example shown in FIG. 2B, the area of the local memory 25 is spaced apart from the main memory area. Notwithstanding this, the local memory 25 may as well be allocated to an area starting from 0x8000_0000 next following the main memory area.

FIGS. 3A and 3B are drawings showing the configuration of a first embodiment of the MMU 22 and the local memory 25. In the present invention, access to the local memory 25 may be restricted among processes so as to provide a further improved safety feature relating to information security. In the first embodiment, in order to restrict access to the local memory 25 among processes, access control is performed based on access IDs that are set by programs that are currently executed.

FIG. 3A illustrates a portion of the configuration of the MMU 22. The MMU 22 converts a logical address supplied from the execution unit 21 into a physical address. As hardware for converting a logical address into a physical address, a translation look-aside buffer (TLB) is provided in the MMU 22. In the translation look-aside buffer, the physical addresses of the logical pages that have recently been accessed are stored as TLB entries 31 with respect to a plurality of processes running on the system. Each TLB entry includes both a logical page number and a physical page number.

As the execution unit 21 attempts to access a logical address, the MMU 22 searches for a TLB entry 31 that matches this logical address. Based on the TLB entry 31 that is found, the logical address is converted into a physical address, allowing access to be performed with respect to desired data. If the currently running program attempts to access a logical page for which no TLB entry 31 exists, a TLB miss occurs, resulting in the operating system performing exception handling. Through this exception handling, a new TLB entry 31 for address conversion will be generated.

The MMU 22 is further provided with a register for storing an access ID 32. This ID may be assigned to an access performed by the currently running program. In the first embodiment of the present invention, the access ID 32 is stored in the MMU 22 as described above, and the value of the access ID 32 in the MMU 22 is written to a control register provided in the local memory 25 at the time of memory allocation for a local memory access.

FIG. 3B is a drawing showing an example of the configuration of the local memory 25. The local memory 25 includes a memory core 41, a command/address decoder 42, and an access ID register 43. The command/address decoder 42 receives an address via the address bus, and also receives a read/write command via the instruction bus. The command/address decoder 42 decodes the address and command to perform a predetermined access operation (write operation or read operation) with respect to the memory core 41.

When the execution unit 21 is to load encrypted information from the exterior, the execution unit 21 issues an initializing command to the local memory 25 to initialize the memory, and also issues a DMA startup command to the secure DMA 23 to perform a DMA transfer process. The initialization of the local memory 25 is done by an initialization unit 42b. When this is done, the value of the access ID 32 in the MMU 22 (i.e., the ID assigned to the access performed by the program that is requesting the DMA transfer process) is copied to the access ID register 43 of the local memory 25.

After the completion of the DMA transfer process performed by the secure DMA 23, the execution unit 21 attempts to access the decrypted information that is stored by the DMA transfer process in the local memory 25. This is done by the execution unit 21 when the execution unit 21 issues a read command and supplies to the MMU 22 a logical address of a read source located in the local memory 25. In response, the MMU 22 converts the logical address of the read source into a physical address for transmission, and also supplies to the local memory 25 the access ID of the process attempting to perform a read access to the local memory 25.

In response to the read command, the command/address decoder 42 of the local memory 25 checks whether the value of the access ID stored in the access ID register 43 (i.e., the access ID of the DMA transfer process) matches the access ID supplied from the MMU 22 (i.e., the access ID of the read process). This is done by an ID comparator 42a provided in the command/address decoder 42. If the value of the access ID stored in the access ID register 43 matches the value of the access ID supplied from the MMU 22, the command/address decoder 42 decodes the received address, and performs a read access with respect to the specified address in the memory core 41. The retrieved data is transmitted from the memory core 41 to the data bus for provision to the execution unit 21.

With this configuration, it is possible to prevent an access if the requested access has an access ID whose value is different from the originally assigned value (i.e., the value of the access ID of the DMA transfer process). The state in which a different access ID cannot access the memory core 41 of the local memory 25 continues to be in place until the content of the access ID register 43 is cleared to release the local memory 25. In this manner, the first embodiment prohibits unwarranted access between different processes, thereby improving the safety of information security.

In the description provided above, provision was made to control access to the local memory 25 based on the access IDs. The present invention is not limited to such configuration. For example, a process ID may alternatively be used in place of an access ID, such that access to the local memory 25 is controlled based on the value of the process ID.

FIGS. 4A and 4B are drawings showing the configuration of a second embodiment of the MMU 22 and the local memory 25. In the present invention, access to the local memory 25 is controlled based on access right, thereby providing a further enhanced safety feature with respect to information security. In the second embodiment, in order to restrict access to the local memory 25 based on access right, access control is performed based on a user-mode/supervisor-mode switching signal (S-bit) that is set by a currently running program.

FIG. 4A illustrate a portion of the configuration of the MMU 22. The MMU 22 is provided with the TLB entry 31 and an S-bit register 51. The S-bit register 51 stores information (privilege-level information) indicating whether the currently running program is executed in a user mode or executed in a supervisor mode. In the second embodiment of the present invention, the value of the S-bit register 51 in the MMU 22 is written to a control register provided in the local memory 25 at the time of memory allocation for a local memory access.

FIG. 4B is a drawing showing an example of the configuration of the local memory 25. The local memory 25 includes the memory core 41, a command/address decoder 52, and an S-bit register 53. The command/address decoder 52 receives an address via the address bus, and also receives a read/write command via the instruction bus. The command/address decoder 52 decodes the address and command to perform a predetermined access operation (write operation or read operation) with respect to the memory core 41.

When the execution unit 21 is to load encrypted information from the exterior, the execution unit 21 issues an initializing command to the local memory 25 to initialize the memory, and also issues a DMA startup command to the secure DMA 23 to perform a DMA transfer process. The initialization of the local memory 25 is done by an initialization unit 52b. When this is done, the value of the S-bit register 51 in the MMU 22 (i.e., the privilege-level information of the program that is requesting the DMA transfer process) is copied to the S-bit register 53 of the local memory 25.

After the completion of the DMA transfer process performed by the secure DMA 23, the execution unit 21 attempts to access the decrypted information that is stored by the DMA transfer process in the local memory 25. This is done by the execution unit 21 when the execution unit 21 issues a read command and supplies to the MMU 22 a logical address of a read source located in the local memory 25. In response, the MMU 22 converts the logical address of the read source into a physical address for transmission, and also supplies to the local memory 25 the privilege-level information of the program attempting to perform a read access to the local memory 25.

In response to the read command, the command/address decoder 52 of the local memory 25 checks whether the value of the privilege-level information stored in the S-bit register 53 (i.e., the privilege-level information of the DMA transfer process) matches the value of the privilege-level information supplied from the MMU 22 (i.e., the privilege-level information of the read process). This is done by an S comparator 52a provided in the command/address decoder 52. If the privilege-level information stored in the S-bit register 53 matches the privilege-level information supplied from the MMU 22, the command/address decoder 52 decodes the received address, and performs a read access with respect to the specified address in the memory core 41. The retrieved data is transmitted from the memory core 41 to the data bus for provision to the execution unit 21.

With this configuration, it is possible to prevent an access if the program (process) that is requesting access has a privilege level that is different from the originally assigned privilege level (i.e., the privilege level of the program (process) that requested the DMA transfer process). The state in which a different privilege level cannot access the memory core 41 of the local memory 25 continues to be in place until the content of the S-bit register 53 is cleared to release the local memory 25. It should be noted that, rather than controlling access based on whether the privilege-level information matches or not, provision may be made to allow the supervisor mode to be given the access right unconditionally. In such a case, if the program requesting an access has a privilege level corresponding to the supervisor mode, access is allowed regardless of whether the originally assigned privilege level is the user mode or the supervisor mode. In this manner, the second embodiment prohibits unwarranted access based on privilege level information, thereby improving the safety of information security.

Figure 5:
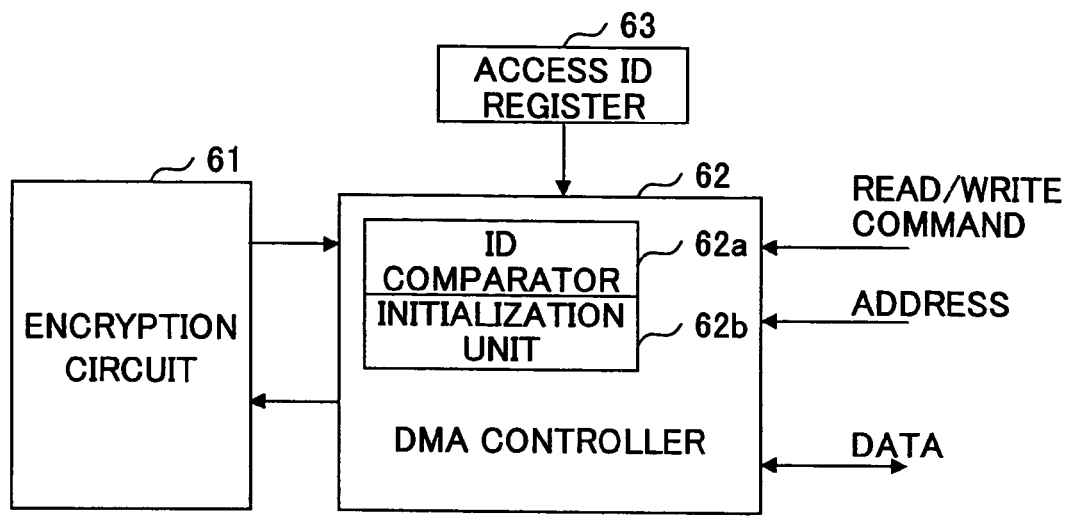
FIG. 5 is a drawing showing the configuration of a first embodiment of the secure DMA.

FIG. 5 is a drawing showing the configuration of a first embodiment of the secure DMA 23. In the present invention, a request to startup the secure DMA 23 is restricted among processes so as to provide a further improved safety feature relating to information security. In the first embodiment of the secure DMA 23, in order to restrict a startup request directed to the secure DMA 23 among processes, startup request control is performed based on access IDs that are set by programs that are currently executed. The MMU 22 used in this embodiment has the same configuration as that shown in FIG. 3A, having a predetermined register for storing the access ID 32.

FIG. 5 is a drawing showing an example of the configuration of the secure DMA 23. The secure DMA 23 includes an encryption circuit 61, a DMA controller 62, and an access ID register 63. The DMA controller 62 receives address information such as a transfer source address and a transfer destination address through the address bus, and also receives a DMA transfer process startup command via the instruction bus. In response to the DMA transfer process startup command, the DMA controller 62 performs a DMA transfer from the transfer source address to the transfer destination address while the encryption circuit 61 performs decryption with respect to the information being transferred by the DMA.

When the execution unit 21 is to load encrypted information from the exterior, the execution unit 21 issues an initializing command to the local memory 25 to initialize the memory, and also issues a DMA startup command to the secure DMA 23 to perform a DMA initialization process (initial setting process) and DMA transfer process. The initialization process of the secure DMA 23 includes the setting of a transfer source address, a transfer destination address, address increments at the transfer source and transfer destination, etc., and is done by an initialization unit 62b. When this is done, the value of the access ID 32 in the MMU 22 (i.e., the ID assigned to the access performed by the program that is requesting the DMA transfer process) is copied to the access ID register 63 of the secure DMA 23.

After the completion of the DMA transfer process performed by the secure DMA 23, the execution unit 21 may attempt to perform another DMA transfer process. In this case, the MMU 22 supplies to the secure DMA 23 the access ID of the process requesting the DMA transfer process.

In response to the DMA transfer process startup command, the DMA controller 62 of the secure DMA 23 checks whether the value of the access ID stored in the access ID register 63 (i.e., the access ID of the previous DMA transfer process) matches the value of the access ID supplied from the MMU 22 (i.e., the access ID of the current DMA transfer process). This is done by an ID comparator 62a provided in the DMA controller 62. If the value of the access ID stored in the access ID register 63 matches the value of the access ID supplied from the MMU 22, the DMA controller 62 performs the DMA transfer process and decryption process, and stores the decrypted information in the local memory 25.

With this configuration, it is possible to deny a requested DMA transfer process if the requested DMA transfer process has an access ID whose value is different from the originally assigned value (i.e., the value of the access ID of the preceding DMA transfer process). Namely, the operation to write data to the local memory 25 (i.e., the write operation performed by a DMA transfer process and decryption process) is prohibited between different access IDs. The state in which a different access ID cannot startup the secure DMA 23 continues to be in place until the content of the access ID register 63 is cleared. In this manner, the first embodiment of the secure DMA 23 prohibits an unwarranted write operation directed to the local memory between different processes, thereby improving the safety of information security.

Figure 6:
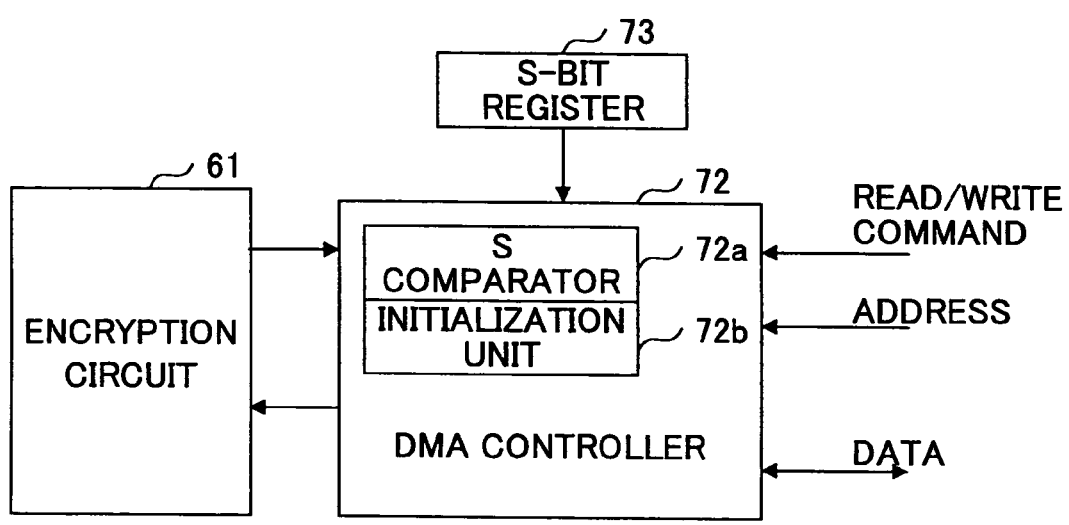
FIG. 6 is a drawing showing the configuration of a second embodiment of the secure DMA.

FIG. 6 is a drawing showing the configuration of a second embodiment of the secure DMA 23. In the present invention, a request to startup the secure DMA 23 is restricted based on access right, thereby providing a further enhanced safety feature with respect to information security. In the second embodiment of the secure DMA 23, in order to restrict a startup request directed to the secure DMA 23 based on access right, startup request control is performed based on a user-mode/supervisor-mode switching signal (S-bit) that is set by a currently running program. The MMU 22 used in this embodiment has the same configuration as that shown in FIG. 4A, having the S-bit register 51.

FIG. 6 is a drawing showing an example of the configuration of the secure DMA 23. The secure DMA 23 includes the encryption circuit 61, a DMA controller 72, and an S-bit register 73. The operation of the DMA controller 72 is basically the same as the operation of the DMA controller 62.

When the execution unit 21 is to load encrypted information from the exterior, the execution unit 21 issues an initializing command to the local memory 25 to initialize the memory, and also issues a DMA startup command to the secure DMA 23 to perform a DMA initialization process (initial setting process) and DMA transfer process. The initialization of the secure DMA 23 includes the setting of a transfer source address, a transfer destination address, address increments at the transfer source and transfer destination, etc., and is performed by an initialization unit 72b. When this is done, the value of the S-bit register 51 in the MMU 22 (i.e., the privilege-level information of the program that is requesting the DMA transfer process) is copied to the S-bit register 73 of the secure DMA 23.

After the completion of the DMA transfer process performed by the secure DMA 23, the execution unit 21 may attempt to perform another DMA transfer process. In such a case, the MMU 22 supplies to the secure DMA 23 the privilege-level information of the program requesting the DMA transfer process.

In response to the DMA transfer process startup command, the DMA controller 72 of the secure DMA 23 checks whether the value of the privilege-level information stored in the S-bit register 73 (i.e., the privilege-level information of the previous DMA transfer process) matches the value of the privilege-level information supplied from the MMU 22 (i.e., the privilege-level information of the current DMA transfer process). This is done by an S comparator 72a provided in the DMA controller 72. If the privilege-level information stored in the S-bit register 73 matches the privilege-level information supplied from the MMU 22, the DMA controller 72 performs the DMA transfer process and decryption process, and writes the decrypted information to the local memory 25.

With this configuration, it is possible to prevent a requested DMA transfer process (i.e., local-memory write process) if the program (process) that is requesting the startup of this DMA transfer process has a privilege level that is different from the originally assigned privilege level (i.e., the privilege level of the program (process) that requested the preceding DMA transfer process). The state in which a different privilege level cannot startup a DMA transfer process continues to be in place until the content of the S-bit register 73 is cleared.

It should be noted that, rather than controlling the startup of a DMA transfer process based on whether the privilege-level information matches or not, provision may be made to allow the supervisor mode to be unconditionally given the right to startup a DMA transfer process. In such a case, if the program requesting the startup of a DMA transfer process has a privilege level corresponding to the supervisor mode, the DMA transfer process is started regardless of whether the originally assigned privilege level is the user mode or the supervisor mode. In this manner, the second embodiment of the secure DMA 23 prohibits an unwarranted write operation directed to the local memory based on privilege level information, thereby improving the safety of information security.

Figure 7:
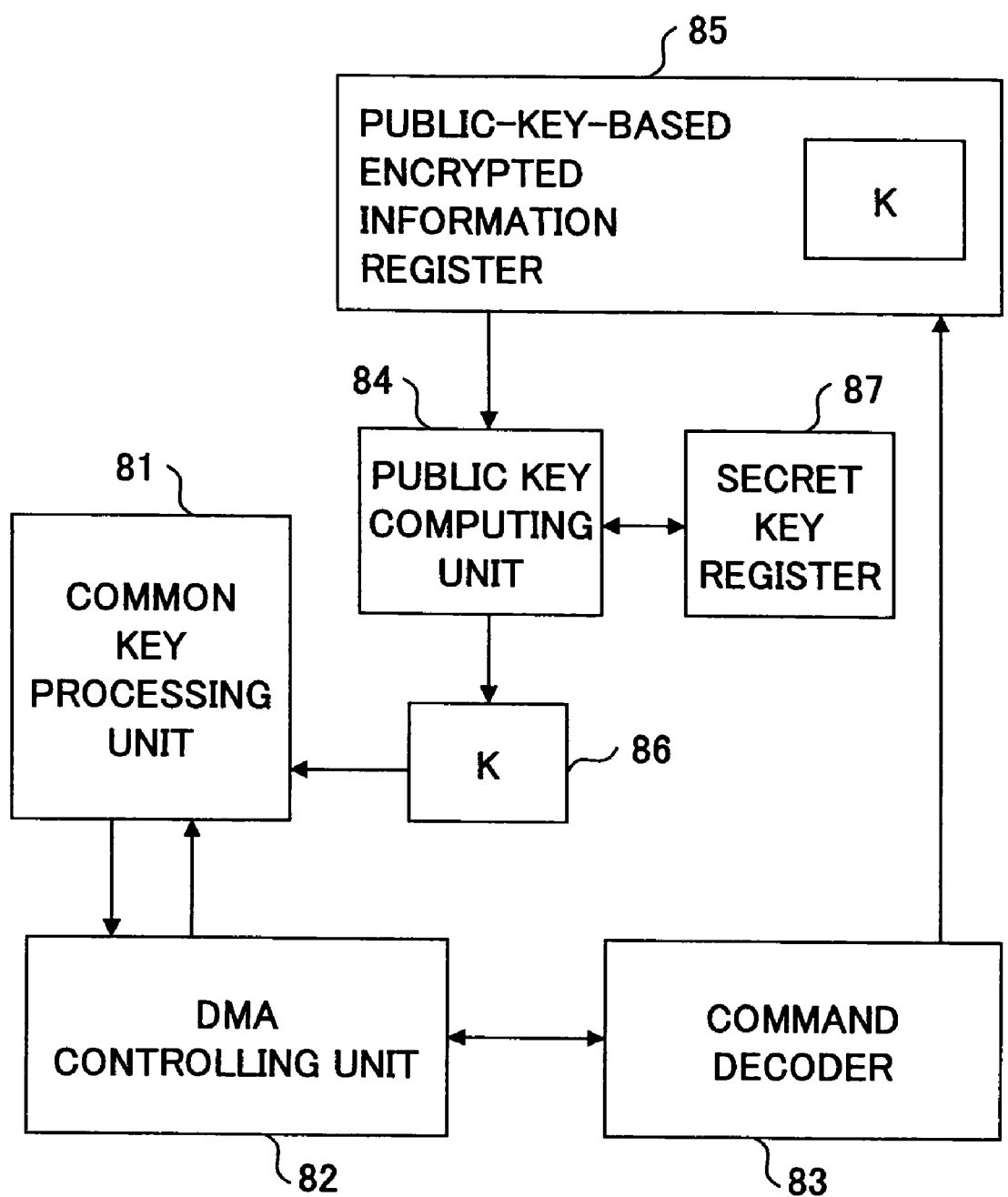
FIG. 7 is a drawing showing the configuration of a third embodiment of the secure DMA.

FIG. 7 is a drawing showing the configuration of a third embodiment of the secure DMA 23. The secure DMA 23 shown in FIG. 7 includes a common key processing unit 81, a DMA controlling unit 82, a command decoder 83, a public key computing unit 84, a public-key-based encrypted information register 85, a common key register 86, and a secret key register 87. In the third embodiment of the secure DMA 23, a common key is encrypted by use of a public key on the encryption side, and the encrypted common key is decrypted by use of a secret key on the secure-DMA side. Provision is thus made to share the common key safely, thereby making it possible to perform the encryption and decryption of information by use of the common key.

The common key processing unit 81 performs encryption and decryption by use of a common key. The common key (K) used by the common key processing unit 81 is stored in the common key register 86. The DMA controlling unit 82 performs a DMA transfer process. The command decoder 83 decodes a command supplied from the exterior. Based on the decoded results, the common key processing unit 81 performs encryption and decryption, and, also, the DMA controlling unit 82 performs a DMA transfer process.

The public-key-based encrypted information register 85 stores the common key K encrypted by use of the public key. This encrypted common key K is stored in the memory 12, for example, which is provided outside the secure processor 10. The encrypted common key K is loaded into the secure DMA 23 prior to the start of a DMA transfer process, and is stored in the public-key-based encrypted information register 85. The public key computing unit 84 uses the secret key corresponding to the public key to decrypt (decode) the encrypted common key K, thereby generating the common key K that is a plaintext. The plaintext common key K generated in this manner is stored in the common key register 86. The secret key for decrypting the common key is stored in the secret key register 87 as an internal key, and is managed such as not to be leaked to the exterior of the secure DMA 23.

FIG. 8 is a drawing for explaining the flow of information in the case where the secure DMA 23 of the third embodiment is used. In FIG. 8, an information source 90 may be a program executed by another system, or may be another system itself. The information source 90 includes a target file 91, an encryption key K, and a public key P. The target file 91 is confidential information, which should be protected by use of a reliable encryption method that prevents it from being deciphered from the exterior.

The target file 91 of the information source 90 is encrypted by use of the encryption key (common key) K specified by the information source 90 (step S1). This encryption process generates an encrypted target file 92 that is encrypted by use of the encryption key (common key) K. Further, the encryption key (common key) K specified by the information source 90 is encrypted by use of the public key P (step S2), which is known to the public. This encryption process generates an encrypted common key 93 that is encrypted by use of the public key P.

The encrypted target file 92 and the encrypted common key 93 are stored in an information storage unit 94 such as the ROM 11, the memory 12, or the HDD 13 shown in FIG. 1, for example.

The secure processor 10 loads the encrypted common key 93 stored in the information storage unit 94, and stores it in the public-key-based encrypted information register 85. The encrypted common key 93 stored in the public-key-based encrypted information register 85 is decrypted into the plaintext common key K by the public key computing unit 84. This decryption process is performed by use of the secret key S stored in the secret key register 87, which forms a pair with the public key P used to encrypt the common key K on the information source side. The plaintext common key K generated in this manner is stored in the common key register 86.

Further, the secure processor 10 reads the encrypted target file 92 stored in the information storage unit 94 through a DMA transfer process performed by the DMA controlling unit 82 for provision to the common key processing unit 81. The common key processing unit 81 performs a decryption process by use of the common key K stored in the common key register 86, thereby to generate the plaintext target file 91. The target file 91 decoded in this manner is transferred to the local memory 25 for storage therein by the DMA transfer process performed by the DMA controlling unit 82.

In this manner, the secret key that forms a pair with the public key is kept inside the secure DMA 23 such that it is not leaked to the exterior. Further, the common key for use in the encryption and decryption of information to be DMA-transferred is distributed outside only in an encrypted state through the encryption using the public key. Accordingly, it is almost impossible to decipher the common key outside the secure DMA 23, which makes it possible to protect the security of information encrypted by use of the common key.

Further, the present invention is not limited to these embodiments, but various variations and modifications may be made without departing from the scope of the present invention.

What is claimed is:

1. A processor, comprising:
   an execution unit configured to execute a program;
   a bus coupled to said execution unit;
   a local memory coupled to said bus;
   a secured DMA unit coupled to said bus and having a decryption/encryption function; and
   an interface to couple said bus to an exterior,
   wherein said secured DMA unit is configured to perform a DMA transfer process transferring information from the exterior to the local memory in response to instruction from said execution unit, said DMA transfer process loading the information from the exterior through said interface, decrypting the loaded information by use of the decryption function, and writing the decrypted information to said local memory, wherein said secured DMA unit has said decryption/encryption function in addition to a conventional DMA transfer function to decrypt the encrypted information upon executing a DMA transfer process command.

2. The processor as claimed in claim 1, wherein said local memory is allocated to an address area outside a main memory space.

3. The processor as claimed in claim 1, wherein said local memory includes:
   a memory core circuit configured to store information;
   a register configured to store an ID relating to the program executed by said execution unit; and
   a control circuit configured to permit or deny access to said memory core circuit in response to a content of said register.

4. The processor as claimed in claim 1, wherein said local memory includes:
   a memory core circuit configured to store information;
   a register configured to store information indicative of a privilege level of the program executed by said execution unit; and
   a control circuit configured to permit or deny access to said memory core circuit in response to a content of said register.

5. The processor as claimed in claim 1, wherein said DMA unit includes:
   a DMA controller configured to perform the DMA transfer process;
   a register configured to store an ID relating to the program executed by said execution unit; and
   a control circuit configured to permit or prohibit an execution of the DMA transfer process in response to a content of said register.

6. The processor as claimed in claim 1, wherein said DMA unit includes:
   a DMA controller configured to perform the DMA transfer process;
   a register configured to store information indicative of a privilege level of the program executed by said execution unit; and
   a control circuit configured to permit or prohibit an execution of the DMA transfer process in response to a content of said register.

7. The processor as claimed in claim 1, wherein said DMA unit includes:
   a first register configured to store a secret key that forms a pair with a predetermined public key;
   a unit configured to perform a decryption process for decrypting predetermined key information in response to a content of said first register;
   a second register configured to store a result of the decryption process; and
   a unit configured to perform a decryption process to decrypt the loaded information by use of a content of said second register as a key.

8. A system, comprising:
   a memory;
   an external bus coupled to said memory; and
   a processor coupled to said external bus, wherein said processor includes:
   an execution unit configured to execute a program;
   an internal bus coupled to said execution unit;
   a local memory coupled to said internal bus;
   a secured DMA unit coupled to said internal bus and having a decryption/encryption function; and
   an interface to couple said internal bus to said external bus,
   wherein said secured DMA unit is configured to perform a DMA transfer process transferring information from said memory coupled to said external bus to the local memory in response to instruction from said execution unit, said DMA transfer process loading information from said memory through said interface, decrypting the loaded information by use of the decryption function, and writing the decrypted information to said local memory, wherein said secured DMA unit has said decryption/encryption function in addition to a conventional DMA transfer function to decrypt the encrypted information upon executing a DMA transfer process command.

9. The system as claimed in claim 8, wherein said local memory is allocated to an address area outside a main memory space.

10. The system as claimed in claim 8, wherein said DMA unit includes:

a first register configured to store a secret key that forms a pair with a predetermined public key;

a unit configured to perform a decryption process for decrypting predetermined key information in response to a content of said first register;

a second register configured to store a result of the decryption process; and a unit configured to perform a decryption process to decrypt the loaded information by use of a content of said second register as a key.

* * * * *